United States Patent
Lewis

(10) Patent No.: US 9,627,081 B2
(45) Date of Patent: Apr. 18, 2017

(54) MANUFACTURING MODE FOR SECURE FIRMWARE USING LOCK BYTE

(75) Inventor: Timothy Andrew Lewis, El Dorado Hills, CA (US)

(73) Assignee: KINGLITE HOLDINGS INC., Singapore (SG)

( * ) Notice: Subject to any disclaimer, the term of this patent is extended or adjusted under 35 U.S.C. 154(b) by 1812 days.

(21) Appl. No.: 11/973,223

(22) Filed: Oct. 5, 2007

(65) Prior Publication Data

US 2009/0094421 A1  Apr. 9, 2009

(51) Int. Cl.
| | |
|---|---|
| G06F 12/00 | (2006.01) |
| G06F 13/00 | (2006.01) |
| G06F 13/28 | (2006.01) |
| G11C 16/22 | (2006.01) |
| G06F 21/57 | (2013.01) |
| G06F 21/78 | (2013.01) |

(52) U.S. Cl.
CPC .......... G11C 16/22 (2013.01); G06F 21/572 (2013.01); G06F 21/575 (2013.01); G06F 21/78 (2013.01)

(58) Field of Classification Search
CPC ...... G06F 21/78; G06F 21/572; G06F 21/575; G11C 16/22
USPC .............. 711/163, 103; 717/168; 713/2
See application file for complete search history.

(56) References Cited

U.S. PATENT DOCUMENTS

| | | | | |
|---|---|---|---|---|
| 5,802,583 A * | 9/1998 | Yeager et al. | | 711/152 |
| 6,032,237 A * | 2/2000 | Inoue et al. | | 711/163 |
| 7,028,177 B2 * | 4/2006 | Schultz et al. | | 713/100 |
| 7,305,668 B2 * | 12/2007 | Kennedy et al. | | 717/168 |
| 7,480,907 B1 * | 1/2009 | Marolia et al. | | 717/174 |
| 2002/0032829 A1 * | 3/2002 | Dalrymple | | 711/5 |
| 2003/0135706 A1 * | 7/2003 | Lin et al. | | 711/163 |
| 2004/0019754 A1 * | 1/2004 | Lin et al. | | 711/156 |
| 2004/0141379 A1 * | 7/2004 | La Malfa et al. | | 365/185.33 |
| 2004/0143828 A1 * | 7/2004 | Liu et al. | | 717/168 |
| 2005/0093674 A1 * | 5/2005 | Wackerl et al. | | 340/5.8 |
| 2005/0097261 A1 * | 5/2005 | Jung | | 711/100 |
| 2005/0114616 A1 * | 5/2005 | Tune et al. | | 711/163 |
| 2005/0223373 A1 * | 10/2005 | Gage et al. | | 717/168 |
| 2006/0138236 A1 * | 6/2006 | Hepworth et al. | | 235/454 |
| 2006/0143600 A1 * | 6/2006 | Cottrell et al. | | 717/168 |
| 2006/0168196 A1 * | 7/2006 | Herbert et al. | | 709/224 |
| 2006/0248267 A1 * | 11/2006 | Xie | | 711/103 |
| 2007/0078957 A1 * | 4/2007 | Ypya et al. | | 709/222 |
| 2007/0150682 A1 * | 6/2007 | Ogasawara et al. | | 711/163 |
| 2007/0234126 A1 * | 10/2007 | Lu et al. | | 714/38 |
| 2007/0300047 A1 * | 12/2007 | Alfano et al. | | 712/38 |
| 2008/0222347 A1 * | 9/2008 | Chamberlain et al. | | 711/103 |
| 2009/0089526 A1 * | 4/2009 | Kuo et al. | | 711/163 |

(Continued)

Primary Examiner — Sheng-Jen Tsai

(57) ABSTRACT

Upon initialization or startup of an electronic device, the device checks a predetermined section of non-volatile memory, referred to as the signature byte or lock byte, and allows either the manufacturing mode which allows for installation of the final or production version of firmware to be loaded into non-volatile memory, or the production mode which write-protects certain portions of non-volatile memory before giving operating control of the electronic device to another program, for example, an operating system. By only allowing execution of operating system or other executable code after write-protecting certain portions of non-volatile memory, system security, integrity, and robustness are substantially increased.

24 Claims, 5 Drawing Sheets

(56) References Cited

U.S. PATENT DOCUMENTS

2011/0205794 A1* 8/2011 Tanaka et al. ........... 365/185.04
2011/0231632 A1* 9/2011 Kurosawa .................... 712/205
2012/0117148 A1* 5/2012 Kawamura et al. .......... 709/203

* cited by examiner

MANUFACTURING MODE FOR SECURE FIRMWARE USING LOCK BYTE

FIELD OF THE INVENTION

The present invention generally relates to system firmware maintenance and, more particularly, to setting and write protecting non-volatile memory in an electronic device.

BACKGROUND OF THE INVENTION

System firmware, for example, basic input/output system (BIOS) or core system software code is typically maintained within a non-volatile memory of a corresponding electronic device, for example, a desktop computer, laptop computer, personal digital assistant (PDA), set top boxes, servers, point-of-sale (POS) devices, automated teller machines (ATMs), wireless communication devices, for example, cellular telephones and other suitable devices and combinations thereof. The system firmware is operative to recognize and initialize the hardware subsystems and components of the electronic device and transfer control of the electronic device to an applicable operating system, upon completion of the initialization process. During the initialization process, sometimes referred to as the power on self test (POST) process, the electronic device retrieves firmware from a predetermined location within the non-volatile memory and loads it into the system memory, commonly referred to as Random Access Memory or RAM. The initialization process ultimately transfers device control to the operating system.

The firmware is typically written to a section of non-volatile memory of the electronic device, such as flash memory, during the manufacturing process. During this process the non-volatile memory must necessarily be write-enabled. A typical, though not exclusive manufacturing process, could include, for example, the assembly of various components of an electronic device, including a non-volatile memory. The non-volatile memory could be loaded with a baseline version of firmware such that the assembled electronic device would be capable of functioning (e.g. have code instructions from memory executed by a processor, with input and output functions operable for the device to communicate with a user). However, the baseline firmware may or may not be the final production version, complete with all code and data intended for final production of the electronic device. Firmware includes executable code as well as data. One piece of data may include a platform identification or platform ID that is a unique identifier of the specific platform or assembly of the electronic device. Such data as well as updates or modifications of the executable code of the firmware may need to be added to the non-volatile memory in order to arrive at the final production version of the firmware.

It is therefore desirable to allow certain untrusted code or code that is not part of the firmware, to have access and write privileges to portions of the non-volatile memory during a manufacturing phase of the electronic device to update firmware executable code, data, platform IDs, etc. However, after the manufacturing phase, when the electronic device is in production phase, for example, when it is transferred to or otherwise under the control of an end-user, it is desirable to have portions or sectors of the non-volatile memory write-protected before any untrusted code is executed. Protecting the non-volatile memory, in part, helps secure and protect the operational integrity of the electronic device.

A conventional method for determining whether firmware is in its final or production state in the non-volatile memory is to have the system initialization procedure check for a specific hardware jumper on the electronic device. If the hardware jumper is in place, then the system assumes that the proper firmware is resident in the non-volatile memory and proceeds through the boot sequence using the resident firmware. The hardware jumper should thus only be placed on the electronic device at a point in the manufacturing process at which the production version of firmware, including for example, the final executable code version, as well as any data such as unique platform identification data or other such data, has been loaded into the non-volatile memory. A drawback associated with the aforementioned process is that it requires the extra manufacturing step of setting a hardware jumper, as well as using up valuable real estate for that physical jumper on the electronic device.

SUMMARY OF THE INVENTION

The present invention provides a device and method for securing non-volatile memory in an electronic device that includes finding a signature byte or lock byte within the non-volatile memory and determining whether the signature byte is set to a default value (that is, some pre-determined and pre-set value used to indicate that a final firmware version is not installed), and if the signature byte is not set to the default value then write-protecting appropriate sectors of the non-volatile memory. Also in accordance with the present invention, a device and method for securing non-volatile memory, which includes the ability to modify or update certain non-volatile memory before write-protecting it, includes reading a signature byte from a non-volatile memory and determining whether the signature byte equals a default value, and when the signature byte equals the default value, then modifying, updating, adding, or otherwise changing sections of the non-volatile memory and then setting the signature byte to a non-default value, and when the signature byte is not equal to the default value, then write-protecting sections of the non-volatile memory.

An advantage provided by the present invention is that it prevents non-volatile memory attacks on a system.

Another advantage provided by the present invention is that it provides an efficient manufacturing process that allows writing to non-volatile memory during a manufacturing mode, but provides write-protection of such non-volatile memory after finalizing and setting the non-volatile memory; thereby placing the electronic device into production mode.

Another advantage of the present invention is that it provides a secure method for updating firmware on an electronic device.

A feature of the present invention is that write protecting the production mode non-volatile memory is accomplished without hardware re-configuration.

BRIEF DESCRIPTION OF THE DRAWINGS

The present invention and the advantages and features provided thereby will be better appreciated and understood upon review of the following detailed description of the invention, taken in conjunction with the following drawings, where like numerals represent like elements, in which.

DETAILED DESCRIPTION OF THE INVENTION

Figure 1:
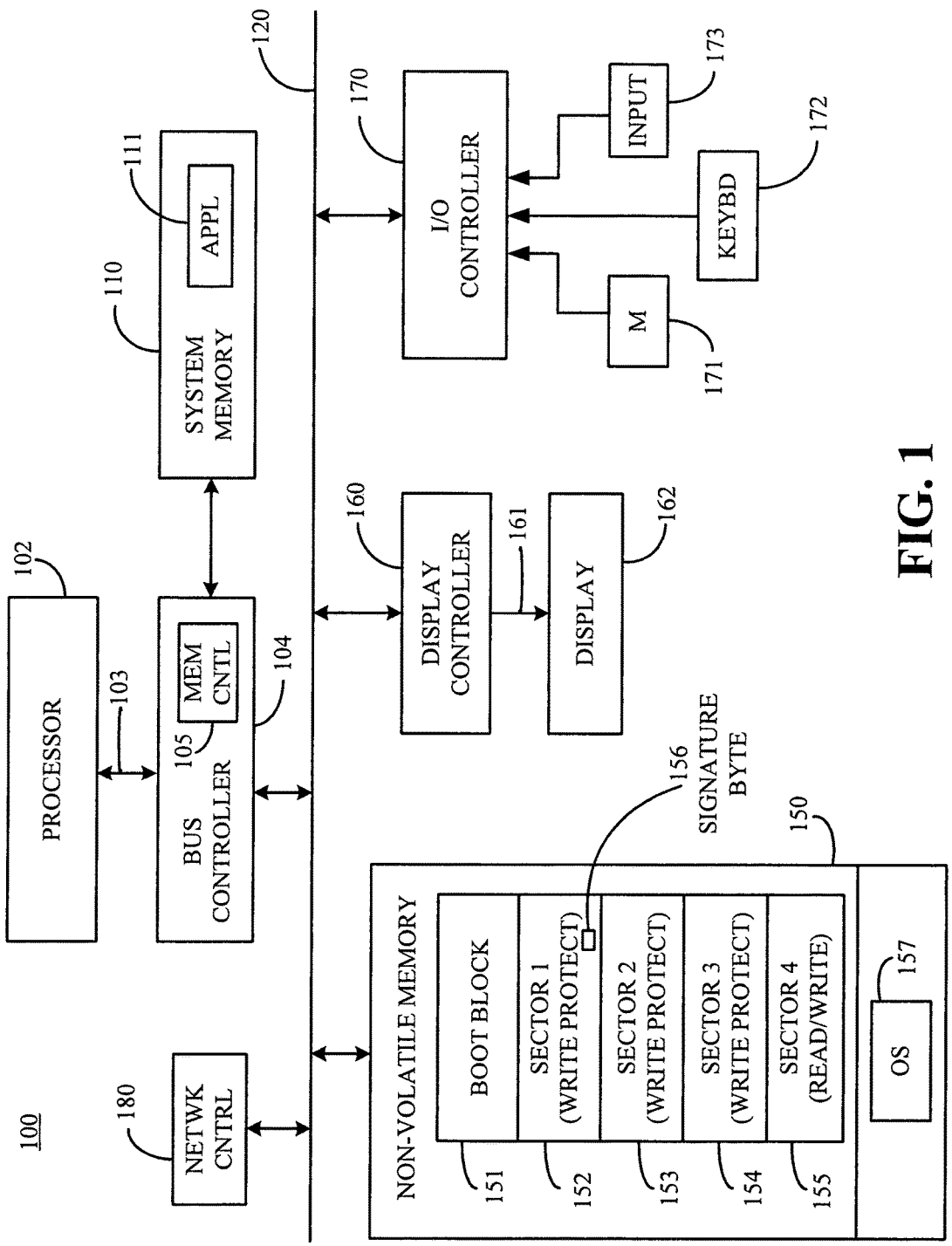
FIG. 1 is a schematic block diagram of an exemplary electronic device configured to provide manufacturing mode modification of non-volatile memory and production mode write-protection of such memory according to the present invention.

An exemplary embodiment of the present invention will now be described with reference to FIGS. 1-5. FIG. 1 is a schematic block diagram of an exemplary electronic device 100, for example, a desktop computer, a laptop computer, a palm top computer, a router or set-top box, a server, a personal digital assistant (PDA), a communications device, for example, a cellular telephone or other suitable device and combinations thereof, configured to implement the secure execution environment of the present invention. For purposes of illustration, and not limitation, the electronic device 100 is implemented as a computer.

The computer 100 includes a processor 102 configured to control the overall operation of the device. The processor 102 may include an arithmetic logic unit (ALU) for performing computations, one or more registers for temporary storage of data and instructions, and a controller for controlling the operation of the computer 100. In one embodiment, the processor 102 includes any one of the x86, Pentium™ and Pentium Pro™ and other suitable microprocessors manufactured by Intel corporation, or the 680×0 processor marketed by Motorola or the Power PC™ or other suitable processor marketed by International Business Machines. In addition, any of a variety of other processors, including those from Sun Microsystems, NEC, Cyrix and others may be used for implementing the processor 102. The processor 102 is not limited to microprocessors, but may take on other forms such as microcontrollers, digital signal processors (DSP), dedicated hardware (e.g. ASIC), state machines or software executing on one or more processors distributed across a network.

The processor 102 is coupled to a bus controller 104 by way of a central processing unit (CPU) bus 103. The bus controller 104 includes a memory controller 105 integrated therein. The memory controller 105 provides for access by the processor 102 or other devices to system memory 110, for example, random access memory (RAM) or other fast access memory device. The system memory 110 may include one or more application programs (APPL) 111 maintained therein, for example, word processing applications, Audio/Video/MP3 applications, virus protection applications or other suitable application programs and combinations thereof.

The bus controller 104 is coupled to a system bus 120, for example, a peripheral component interconnect (PCI) bus, industry standard architecture (ISA) bus, universal serial bus (USB), a wireless connection or other suitable communication medium. Coupled to the system bus 120 is a non-volatile memory 150, for example, a read only memory (ROM), a non-volatile random access memory (NVRAM), a hard disk, flash memory, optical data readers, or other non-volatile storage mediums as known in the art, and combinations thereof. The non-volatile memory 150 maintains code segments and corresponding data segments, such as a Boot Block 151, and other various Sectors 152-155. Additionally, non-volatile memory 150 contains the Operating System (OS) 157. The OS 157 main be located, for example, in any of various forms of non-volatile memory, such as, hard disk, removable media such as optical disk drives or USB flash drives, or other storage media as may be known in the art that is available on the computer 100.

The Sectors 152-155 contain different types of code or program sections. For example, Sector 1 (152) may contain the Basic Input/Output System (BIOS) code of the computer 100. According to the present invention, a signature byte 156, also known as a lock byte, may be stored in a section of the non-volatile memory 150. According to one embodiment of the present invention, the signature byte 156 is stored in a sector of the non-volatile memory 150 that is write-protected in accordance with the present invention to thereby gain write-protection of the signature byte 156. As discussed in detail in FIGS. 2 and 3 below, the signature byte 156 may be used to determine when the computer 100 is in manufacturing or production mode.

When the computer 100 is booted up or powered-on in production mode, the Boot Block 151 is operative to cause the processor 102 to retrieve the OS 157 from its storage location within the non-volatile memory 150, load the OS 157 into device memory, such as system memory 110, and startup the OS 157. Loading a boot block may be accomplished, for example; by the processor 102 retrieving the Boot Block 151 code from a predetermined portion or section of the non-volatile memory during POST, or monitoring the system bus 120 in order to detect any devices coupled to a corresponding internal expansion slot or external connection port or other connection point to the system bus 120 for components that may include a boot block.

Also coupled to the system bus 120 is a display controller 160, operative to transfer data 161 for display on a corresponding display device 162, an input/output (I/O) controller 170 and a network controller 180, for example, a wireless network controller. The display controller 160 may be implemented by any suitable device, for example, a graphics processor, capable of formatting digital data 161 for proper display and viewing on a corresponding display device 162, for example, a flat panel display, CRT display, printer, plotter or other suitable presentation device and combinations thereof.

The I/O controller 170 may be implemented by any suitable device capable of transferring information, for example, signals containing data and/or instructions between the processor 102 and a variety of input and/or output devices including, but not limited to, a mouse 171, keyboard 172, and pen input device 173. The pen input device 173 may be implemented as a touch screen, soft keys, optical input device or other suitable input devices or combinations thereof.

The network controller 180 may be implemented, for example, by a wireless network access controller or other suitable device or applicable software capable of connecting the underlying computer 100 to a larger network, for example, the Internet.

When implemented in software, the elements of the present invention are essentially the code segments to per-form the necessary tasks. The program or code segments can be stored, for example, in a processor readable medium or transmitted by a computer data signal embodied in a carrier wave over a transmission medium or communication link that can be accessed, for example, by the network controller 180. The processor readable medium may include, a storage medium, for example, an electronic circuit, a semiconductor memory device, a ROM, RAM, a flash memory, an erasable ROM (EROM), a floppy diskette, a CD-ROM, an optical disk, a hard disk, or a transmission medium such as a fiber optic medium, a radio frequency (RF) link or any suitable medium or combination thereof. The computer data signal may include any signal that can propagate over a transmission medium, for example, electronic network channels, optical fibers, air, electromagnetic, RF links or any other suitable medium or combination thereof. The code segments may be downloaded via computer networks, for example, the Internet, LAN, WAN or any suitable network or combination thereof.

In application, the Boot Block 151 and portions of Sectors 152-155 are transmitted to the system memory 110 for execution by the processor 102. By being maintained in non-volatile memory 150, the Boot Block 151, Sectors 152-155, and Operating System 157 will not be lost or overwritten as a result of power being removed from the computer 100. The method of modifying and manipulating (as in the manufacturing mode) and write-protecting (as in the production mode) the various Sectors 152-155 of the non-volatile memory 150 for use and operation in an electronic device will now be discussed with reference to FIGS. 2, 3, and 4. By way of example, this discussion will refer to firmware stored in flash memory, though it should be understood by those of skill in the art that other types of non-volatile memory could be used according to the present invention.

Figure 2:
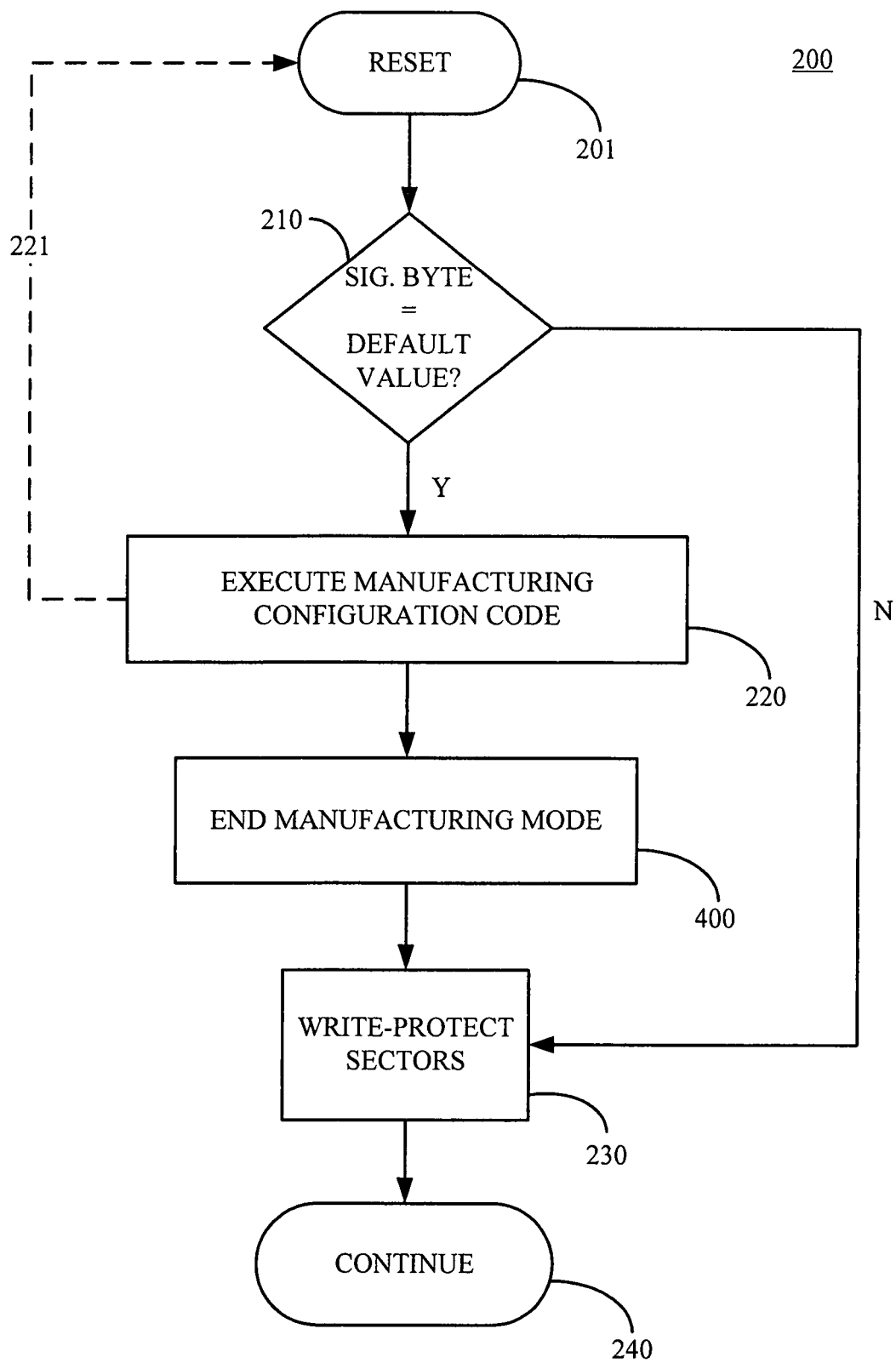
FIG. 2 is a flow chart illustrating the operations performed by the exemplary electronic device to provide the manufacturing and production modes of operation of the electronic device according to the present invention.

The steps shown in FIG. 2 are performed when the computer 100 begins execution of the reset vector 200 (e.g. during the start up or initialization period (a.k.a. POST), system reset, etc.) which is when the computer 100 is outside of the period that the applicable operating system is executing. Thus, the present invention executes in what is referred to as the pre-operating system environment. The reset vector method 200 begins at step 201 and continues through step 240, where normal operation of the computer 100 commences or resumes.

The relevant portion of reset vector 200 is shown in FIG. 2. Those of skill in the art may recognize that steps or functions not explicitly shown or discussed with reference to FIG. 2 may be followed when an electronic device 100 enters a reset function in order to bring the device to its operational state. For purposes of this discussion, steps not relating to the present invention are not explicitly discussed. Typical ways of reaching the reset vector 200 include, but are not limited to, power-on, system reset, CPU reset, resume from CPU-off suspend and software JMP (jump) instruction. Typically, power-on, resume from CPU-off suspend, and system reset will allow the flash device to be writable. However, CPU reset and the software JMP instruction will not allow writing to the flash device because the flash device does not typically receive a reset under those conditions, and so the flash device is not unlocked. If the firmware detects CPU reset or the software JMP instruction and desires the flash device to be writeable, the firmware may force a system reset using, for example, a platform-specific method, such as a write to a particular I/O, memory location, or chipset register, to reach a state that resets the flash device and thus allows the flash device to be writable.

FIG. 2 is a flow chart illustrating the relevant portion of the reset vector 200 performed by the computer 100 to provide for initialization of the firmware and secure execution and write protection of the flash memory according to the present invention. In other words, the method 200 illustrated in FIG. 2, when executed by the computer 100, either: (i) allows modification of the Sectors 151-155 as needed in manufacturing mode, so that a system manufacturer may load the final production version of code and data into the non-volatile memory 150 according to steps 220 and 400; or (ii) does not allow modification of the Sectors 151-155, and sets write-protection for certain Sectors 151-155 of the non-volatile memory 150. The write-protected mode may prevent untrusted software programs from writing to portions of the non-volatile memory 150, such as BIOS or other core system software, and is intended to protect the memory from malicious software attacks.

Step 201 indicates the starting point or the beginning of the reset vector 200. In step 210, the signature byte is evaluated. If the signature byte has or is equal to a certain predetermined value then the signature byte indicates that the flash memory is in its final production state. The predetermined value could be set to any value, so long as the code executing step 210 properly recognizes that value, and code discussed further with respect to FIG. 4 uses that value to mark the end of the manufacturing mode.

Generally speaking, there are three basic scenarios for using a signature byte to determine when an electronic device 100 is in production mode or manufacturing mode. First, the signature byte could be set to a predetermined value (such as a manufacturer's default value or other suitable value) during manufacturing mode and any other value different from that predetermined value during production mode. Second, the signature byte could be set to a predetermined value during production mode and any other value different from that predetermined value during manufacturing mode. Third, the signature byte could be a first predetermined value during manufacturing mode and be a second predetermined value different from the first predetermined value during production mode. Provided that proper initialization of the memory occurs (either by the manufacturer, or during the manufacturing phase) and the programming logic recognizes the appropriate values, then any variation of these basic scenarios may be used with success according to the present invention.

According to one embodiment of the present invention, the signature byte being set to a default value will indicate that the final version of firmware has not been loaded into the non-volatile memory. This value may be, for example, the manufacturer's default value, that is, the value set for the memory device upon completion of the manufacturing process. Alternatively, the default value could be any other value that is predetermined and then pre-set into the signature byte of the memory device. That pre-set value would then be used to determine whether the final version of firmware has been loaded.

In accordance with one embodiment of the present invention, the manufacturer's default value of flash memory is used as the predetermined and pre-set value of the signature byte. In that case, the signature byte should be unaltered (and therefore equal to the default value as set when the flash memory is initially manufactured) until the flash memory is modified to contain the final production version of code and data. At that point, a non-default value may be written to the signature byte to indicate that the final version of the firmware has been written to the non-volatile memory. One exemplary method is to write a non-default value that is, for example, the bitwise-NOT of the default value. Thus, for a default value of 0 in a bit of the signature byte, the bit will be changed to 1. This may be done for each bit of the signature byte, until all bits have been changed from the default value.

Various values may be used with success, provided the programming logic recognizes values of the signature byte used to indicate manufacturing mode (allowing the update and addition of firmware to non-volatile memory) and production mode (in which the non-volatile memory should be write-protected). In certain cases proper initialization of the signature byte must be accounted for. For example, if the manufacturer's default value of the flash device is not used as a predetermined value to indicate manufacturing mode, then the signature byte must be set with the predetermined value. When using, initializing, and setting values to indicate manufacturing and production mode of the electronic device, factors particular to a given memory device must also be accounted for. For example, a memory device may not allow writing or setting of certain bytes to certain values without writing or setting that value to the entire sector. For example, it may not be possible to set a signature byte back to the manufacturer's default value of the memory device without setting the entire sector in which the signature byte resides to that default or erased value.

In accordance with step 210, if the signature byte is equal to the default value of the flash memory, then the flash memory does not have the final version of code. The system is said to be in manufacturing mode, and control is passed to step 220.

Step 220 includes execution routines that write the production version of code to the non-volatile memory, for example, the final firmware version, platform ID, and/or other code and data. One of skill in the art should recognize that this procedure may be used to modify any software in non-volatile memory of the computer 100, and not merely software that is in flash memory.

According to one embodiment of the present invention, step 220 may include logic for setting the final configuration of the non-volatile memory that requires multiple passes through the reset vector 200. This is indicated by dotted path 221 which loops back to the beginning of the reset vector 200. Provided that step 400 has not been executed, the signature byte should remain at the default value, and so the manufacturing configuration procedure of step 220 will be entered repeatedly until configuration is complete.

When the configuration of the non-volatile memory, including, for example, sections 151-155 (FIG. 1), is complete, then step 400 is executed. Step 400, as discussed in more detail in FIG. 4 below, ends the manufacturing mode and sets the signature byte to a production mode value, such as, for example, a value different from the default value.

After step 400, certain portions of the non-volatile memory are write-protected in step 230. Write-protecting the non-volatile memory, such as sectors 151-155 (FIG. 1), may be done by any suitable methods as may be known in the art. For example flash memory may be write-protected using flash program commands. Alternatively, one may use chipset write-protect registers to write protect memory. Another method of write-protecting includes, for example, using CPU registers to prevent writes from going to the specified regions of memory. Yet another method includes using software commands to change the state of a general purpose output, where that general purpose output is connected to the pin or pins of a memory device that control the write-protection of the desired sectors of the memory device. For security of the memory device, the state of the general purpose output is locked until the next reset or power-on.

In accordance with one embodiment of the present invention, the signature byte is located within the sector of the non-volatile memory that is to be write-protected. Therefore, by write-protecting the sector of non-volatile memory that, for example, has the final or production version of firmware, the signature byte is also write protected; thus preventing someone or some untrusted code from tampering with the signature byte. In that way, it is difficult for an untrusted third party to, for example, place or return the signature byte back to its default value such that, at the next execution of the reset vector 200, the electronic device may, in essence, be tricked into believing it is in production mode and thus allow writing to the non-volatile memory. Rather, by putting the signature byte into the write-protected sector, possibility for such an attack is reduced. Alternatively, it is possible to have the signature byte in a section of memory different from the sector that is write-protected with the final firmware version. In this case, it is advantageous to also write-protect the memory in which the signature byte is stored, which may be done with any suitable write-protection technique as previously discussed or known in the art.

The write-protection of the specific sectors of the non-volatile memory, including, for example, the non-volatile memory that contains the final production version of the firmware and the signature byte, should preferably be write-protected in a manner that may not easily, or without some proper forms of authorization, be brought out of write-protected mode. This is important to prevent tampering with the final production version of the firmware. For example, the write-protected memory is preferably only brought out of write protection upon execution of the reset vector 200, such as at a power-on or resume. Thus, upon executing the reset vector 200, the write protection will again be set and assured as the signature byte will provide the indication that the device is in production mode and the non-volatile memory should be write-protected.

According to one embodiment, the write-protection of the non-volatile memory that contains the firmware is effectively controlled by the firmware, for example, by setting and locking the state of a general purpose output that has been connected to a pin or pins of the non-volatile memory device that control write-protection of the sectors of the non-volatile memory. By connecting and locking the state of the general purpose output to the appropriate pin or pins, the Operating System will be unable to change the write-protection on the memory. This is advantageous in preventing untrusted third parties from exploiting Operating System services to attack the firmware.

In step 240, system functionality is invoked that continues the operation of the electronic device as it goes through its normal boot or reset vector process in order to bring the electronic device to its production mode operating condition. For example, firmware is read from the flash memory and placed into the system memory for execution by the processor. The firmware may then turn over control of the electronic device to other code, for example, an Operating System, with the assurance that core and critical sections of the flash memory are write-protected.

Figure 3:
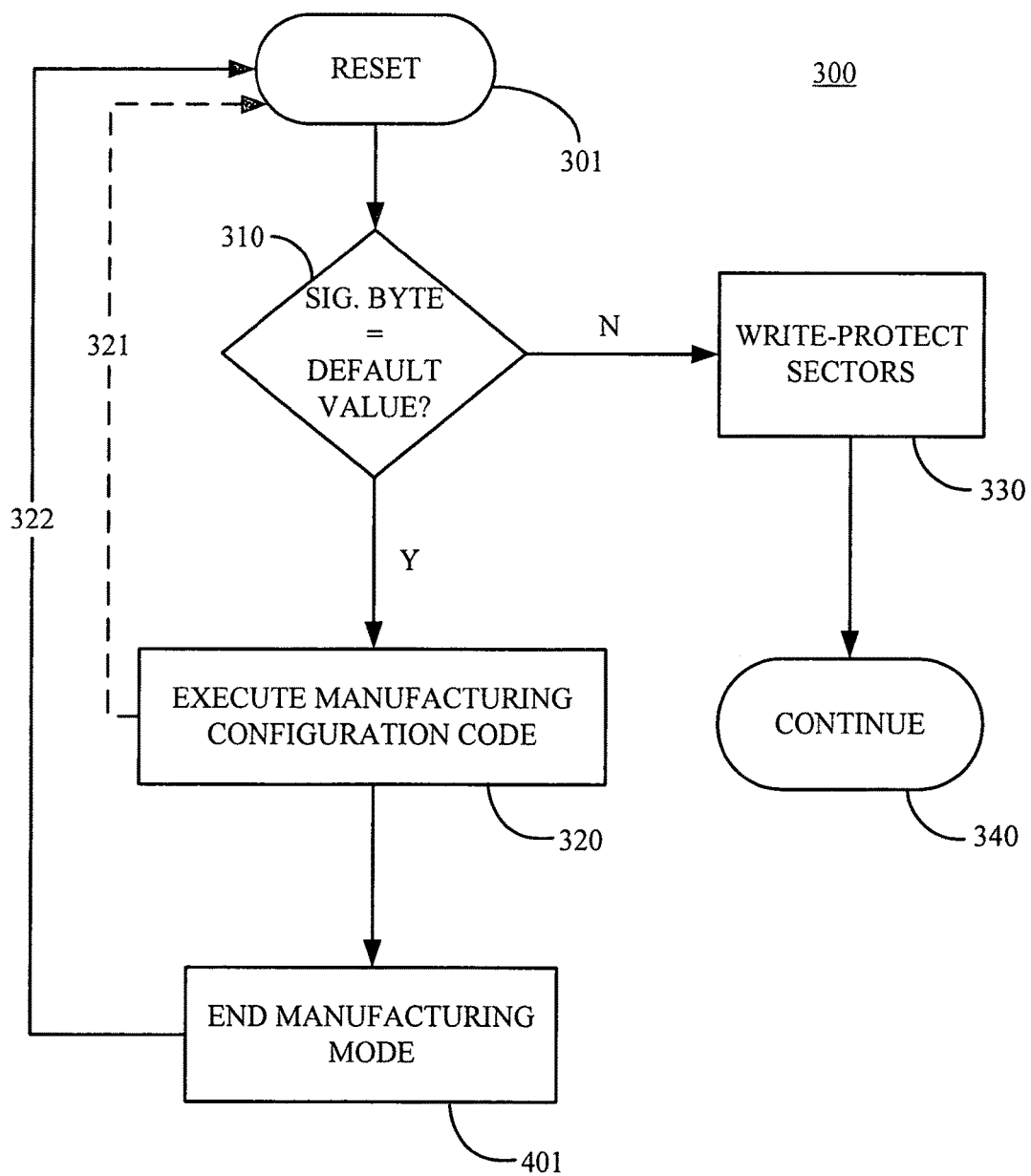
FIG. 3 is a flow chart illustrating an alternative logical flow of operations according to the present invention.

One of skill in the art should recognize that there are alternative logical procedures that will result in the manufacturing mode and production mode of operation of the electronic device in accordance to the present invention. For example, as shown in FIG. 3, an alternative logic that provides an equivalent result, includes having step 401 create a loop 322 back to the start of the reset vector 301.

The signature byte will be tested in step 310 and now be found different from the default value. Thus, the write-protection of step 330 is invoked similarly to that of step 230 in FIG. 2, but following a suitable but different logical flow.

Figure 4:
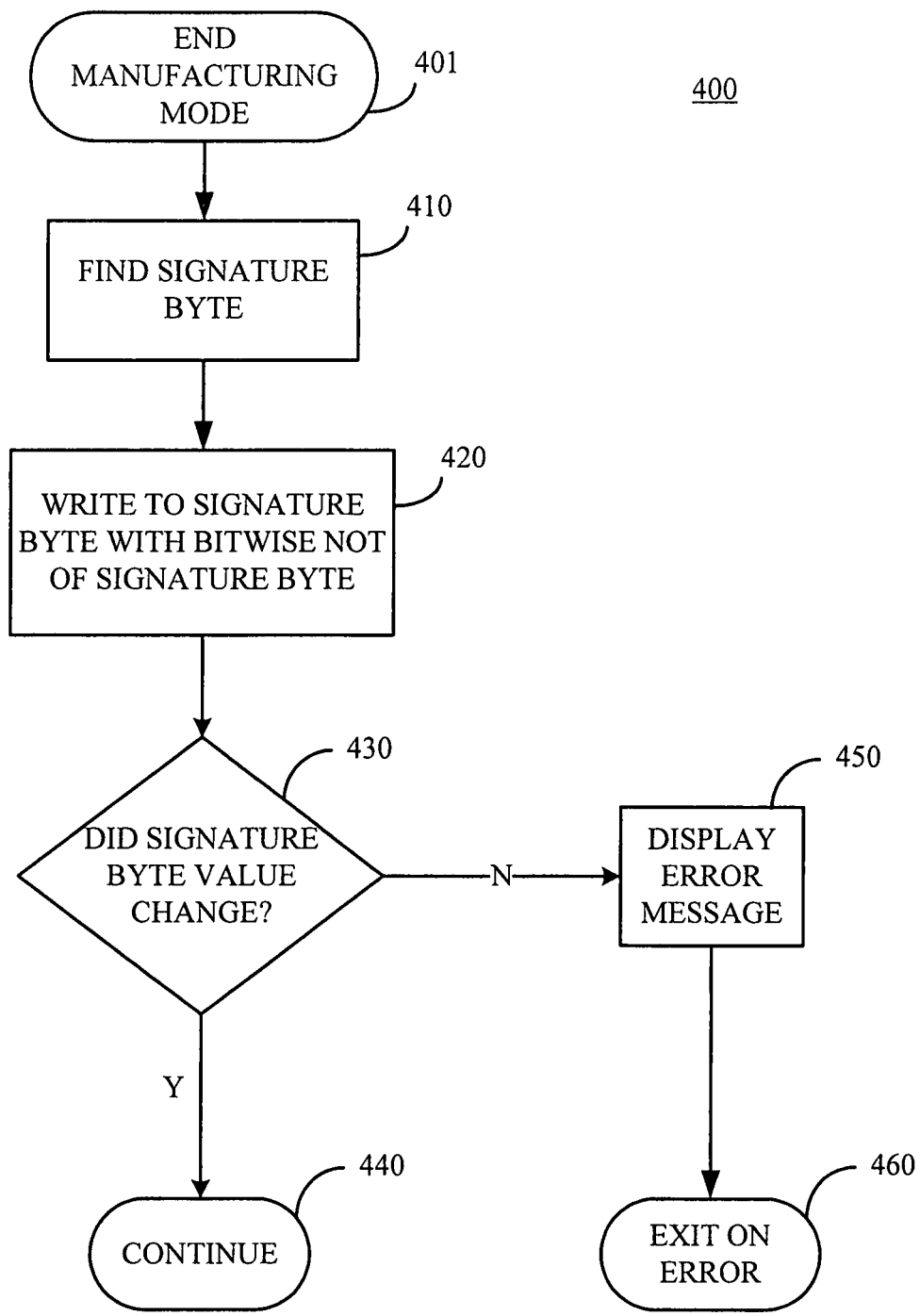
FIG. 4 is a flow chart illustrating the details of a process flow that converts the device from entering manufacturing mode upon a reset to entering production mode upon all future reset actions performed by the exemplary electronic device according, to the present invention.

Step 400 in FIG. 2 is described more fully with respect to FIG. 4, where the signature byte is changed to a value that indicates that the non-volatile memory has been established in production mode.

By way of background, in accordance with one embodiment of the present invention, typical non-volatile memory 150 has a default value that is dependant on the manufacturer and/or type of flash memory in the electronic device 100. For example, in NOR flash parts, the industry practice and/or physical properties of the device determine that each byte's default value may be represented in hexadecimal as 0xFF, meaning each bit is set to 1. The industry practice and/or physical properties of NAND flash parts dictates that the default value of each byte is 0x00, meaning each bit is set to 0.

According to standard industry practice and/or the physical properties and characteristics of particular flash memory devices, data (information, code, digital format data) may be written byte-wise to the flash memory provided that the data is not equivalent to the default or "erased" value. For example, one may write in a byte-by-byte method any value except 0xFF (the default or erased value) of NOR flash parts. However, a byte-wise write that attempts to place the value 0xFF into a byte will fail. The only way to place 0xFF (or, indeed, to change any bit value from '0' to '1' within a byte) into a NOR flash part is to erase (or reset to the default value of 0xFF) an entire sector, but this value can not be set to individual bytes. Similarly, this applies to NAND flash parts except that the default or erased value is 0x00.

The procedure shown in FIG. 4 uses these known features of standard industry NOR and NAND flash parts to implement the present invention, though one of skill in the art should recognize that similar logic may be used to set specific pre-determined values in the signature byte rather than using default values.

Step 401 indicates the beginning of the procedure to end manufacturing mode of the electronic device. In step 410 the signature byte is found within the non-volatile memory. This may be done, for example, by searching for a specific header structure that is unique to the signature byte, by searching for a specific memory location where the signature byte is stored, for example, a specific memory address within the non-volatile memory, or any other known or developed methods of locating a specific byte within a memory device.

When the signature byte is found, then according to step 420, the signature byte is written back to itself after performing a bitwise-NOT operation on the signature byte. This may be done, for example, by reading the value of the signature byte into a temporary data register, executing a bitwise-NOT on that value, and writing that new value back to the signature byte in the non-volatile memory. A bitwise-NOT operation changes each bit from its original value to its compliment. Thus, if the signature byte is the default NOR flash value of 0xFF (8 bits with the value 1 in each bit), then the bitwise-NOT becomes 0x00 (i.e. 8 bits with the value 0 in each bit). Since 0x00 is not the default value of NOR flash parts, then writing to the signature byte with the value 0x00 will be successful.

Step 430 requires a test to see if the signature byte changed value. Writing to the signature byte will be successful provided that the value of the bitwise-NOT operation does not yield the default value of the flash memory part (i.e. 0xFF for NOR parts, 0x00 for NAND parts), and therefore, any operation that starts with the signature value equal to the default value and ends by writing the bitwise-NOT into the signature byte should be successful. With the signature byte successfully changed at step 430, the system proceeds through step 440 to continue operating the electronic device 100.

If, on the other hand, there is some error in the logic of the code, or the write routine is incorrect because, for example, a different type (or manufacturer) of flash memory was expected, then the write procedure of step 420 will fail, the signature byte value tested in step 430 will not change, and thus step 450 will be invoked to present an error message.

The error message of step 450 is displayed to the user indicating that the signature byte has not been modified from its default value and thus, firmware has not been properly set to its final or production state in the appropriate Sectors 151-155 (FIG. 1) of the non-volatile memory 150. The error message may be, for example, a visual warning, an audible warning, for example, the sounding of an alarm or other audible signal, or a combination of visual and audible warnings. After the error message is displayed or otherwise provided to the user, the system will exit under error in step 460 rather than continue to normal operating mode.

Figure 5:
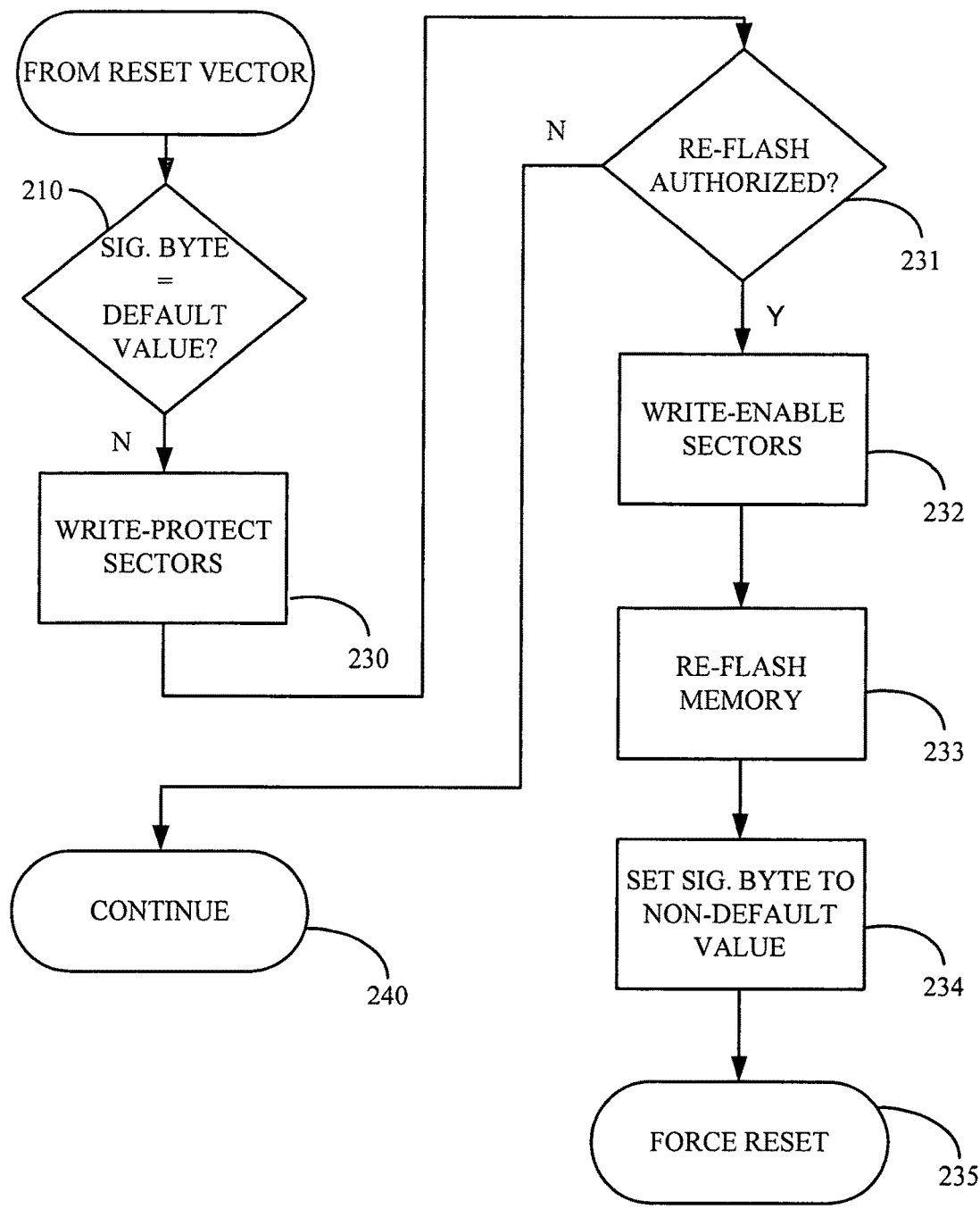
FIG. 5 is a flow chart illustrating a process for allowing an electronic device to update, load, or replace software in non-volatile memory of the device.

FIG. 5 shows a further embodiment of the present invention that provides an opportunity for an electronic device to allow reflashing of the firmware, even after the device has been placed into the production mode. For example, if an electronic device has been in use (i.e. in production mode), but a new version of firmware becomes available, it may be desirable to allow new firmware to be loaded into non-volatile memory, which may be referred to as reflashing memory.

As seen in FIG. 5, after step 230, the firmware tests in step 231 to see if a reflash is authorized. This is preferably controlled by the firmware (i.e. not an operation open to the Operating System), in order to prevent unauthorized tampering with the firmware. The authorization could be handled in any number of suitable methods. For example, a BIOS user interface could provide an option to allow reflashing of the memory. If a user selects that option, username and password may be required to proceed with a reflash. Another authorization might include, for example, requiring the file containing the updated firmware to authorize itself with the existing firmware. If the new firmware contains proper codes and/or can make some form of secure handshake with the existing firmware (via PKI or other cryptographic techniques, or other secure interface methods, for example), then the existing firmware may allow the reflash to proceed. Unauthorized firmware will not be able to properly authenticate, and the reflash would not proceed.

According to one embodiment, the firmware resident on an electronic device 100 contains the public key of a cryptographic key pair. Any firmware that will be used to reflash the non-volatile memory will need to be encrypted with the private key of such cryptographic key pair. The firmware manufacturer may protect the key pair well to ensure that only authorized firmware developed by, for, or in cooperation with the manufacturer can access the private key to encrypt the updated firmware. Alternatively, the firmware that will be used to reflash the memory might be signed via certificates or other suitable method and only authorized/signed versions of firmware will be allowed to reflash according to the present invention.

Due to the critical nature of firmware and its close integration with the hardware or platform of the electronic device, the new firmware may be required to pass certain criteria, such as identifying elements of the hardware platform for which it is intended. If the platform upon which the existing firmware is operating does not sufficiently match with the platform for which the new firmware is intended, the reflash may not be authorized.

With proper authentication or authorization established in step 231, the firmware proceeds to step 232 and write-enables the non-volatile memory. With memory write-enabled, the new firmware is flashed into the non-volatile memory as per step 233. One of skill in the art should recognize that the reflash procedure may require operations that take into account the properties and characteristics of the non-volatile memory. For example, a flash memory device may have to be reset to a default value on a sector by sector basis, because byte-wise or bit-wise setting of memory to the default value may not be possible. After reflashing the non-volatile memory, step 234 indicates that the signature byte is set to a non-default value, which indicates that the device is in production mode. Upon step 235, the device enters the reset vector 200, during which the signature byte will be found to indicate production mode, appropriate sectors of the non-volatile memory are write-protected, and the newly installed firmware may be read from the non-volatile memory into system memory.

By implementing the method of the present invention, a secure flash memory section is established and maintained within an electronic device by preventing the system firmware (e.g. BIOS or core system software) from being overwritten by untrusted programs or code, by write-protecting appropriate non-volatile memory. In this manner, security breaches related to flash memory attacks and the like within an electronic device are substantially reduced or eliminated.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings. Accordingly, the scope of the present invention is to be defined by the claims appended hereto.

What is claimed is:

1. A method for securing non-volatile memory comprising:
   updating a signature byte, stored within a non-volatile memory, from a default value specifying a write-protected mode to an updated value specifying a write-enabled mode;
   after updating the signature byte from the default value to the updated value, determining that the signature byte is set to a value associated with the write-enabled mode;
   write-protecting at least one sector of the non-volatile memory if the signature byte is not set to the value associated with the the write-enabled mode;
   after updating the signature byte from the default value to the updated value, preventing an entire sector in which the signature byte resides from being set to a predefined sector value unless a replacement firmware identifier associated with a replacement firmware matches a required replacement firmware identifier;
   determining whether a reflash of the non-volatile memory is authorized by comparing the replacement firmware identifier against the required replacement firmware identifier and indicating that reflash of the non-volatile memory is authorized if the replacement firmware identifier matches the required replacement firmware identifier; and
   if the reflash of the non-volatile memory is authorized, write-enabling the non-volatile memory, reflashing the non-volatile memory, and setting the signature byte to a value different from the value associated with the the write-enabled mode.

2. The method of claim 1, wherein the default value is an initial state of the non-volatile memory or a result of performing an erase operation.

3. The method of claim 1, further comprising the step of finding a signature byte by searching for a pre-determined header structure within the non-volatile memory, the pre-determined header structure being unique to the signature byte.

4. The method of claim 1, further comprising the step of finding a signature byte by reading a pre-determined location within the nonvolatile memory.

5. The method of claim 4, wherein the pre-determined location of nonvolatile memory is a memory address.

6. The method of claim 1, wherein the signature byte is located within the at least one sector of the non-volatile memory.

7. The method of claim 6, wherein the step of write-protecting the at least one sector of the non-volatile memory remains in effect until at least one of a power-on, system reset, or resume from CPU-off/suspend.

8. The method of claim 1, wherein the signature byte is not located within the at least one sector of the non-volatile memory, and further including the step of write-protecting the signature byte if the signature byte is not set to the value associated with the the write-enabled mode.

9. The method of claim 8, wherein the step of write-protecting the signature byte remains in effect until at least one of a power-on, system reset, or resume from CPU-off/suspend.

10. The method of claim 1, wherein the non-volatile memory is a flash memory, and the step of write-protecting the at least one sector of non-volatile memory includes using flash-programming commands to set at least one sector of the flash memory to a write-protected state.

11. The method of claim 1, wherein the step of write-protecting the at least one sector of the non-volatile memory includes using chipset write-protect registers.

12. The method of claim 1, wherein the step of write-protecting the at least one sector of the non-volatile memory includes connecting a general purpose output to a pin of the non-volatile memory that controls writing to the non-volatile memory and setting the general purpose output to a state that disables writing to the non-volatile memory.

13. The method of claim 12, wherein the state of the general purpose output is locked until an electronic device is reset.

14. The method of claim 1, further comprising the steps of:
   modifying firmware of the non-volatile memory if the signature byte is set to the value associated with the the write-enabled mode, and then changing the signature byte to a different value than the value associated with the the write-enabled mode.

15. The method of claim 14, wherein the step of modifying the firmware further includes adding firmware to the non-volatile memory.

16. The method of claim 14, wherein the step of changing the signature byte includes writing to the signature byte with a bitwise not of the signature byte.

17. The method of claim 16, wherein the at least one sector of non-volatile memory is either NAND-type flash or ~OR-type flash, and wherein the step of changing the signature byte further comprises the steps of:
  determining whether the value of the signature byte changed following the step of writing to the signature byte with a bitwise not of the signature byte; and
  if the signature byte value does not change following the step of writing to the signature byte with a bitwise not of the signature byte, reporting an error message.

18. The method of claim 1, wherein the step of determining whether a reflash is authorized further includes receiving a username and password combination.

19. The method of claim 1, wherein the step of determining whether a reflash is authorized further includes making a secure handshake between a firmware resident in the non-volatile memory and a replacement firmware.

20. The method of claim 19, wherein the secure handshake includes using cryptographic keys.

21. The method of claim 19; wherein the secure handshake includes using a replacement firmware that is electronically signed.

22. An electronic device, comprising:
  a processor; and
  a system memory, coupled to the processor, the system memory maintaining instructions that if executed by the processor, cause the processor to:
    update a signature byte, stored within a non-volatile memory, from a default value specifying a write-protected mode to an updated value specifying a write-enabled mode;
    after updating the signature byte from the default value to the updated value, determine that the signature byte is set to a value associated with the write-enabled mode;
    write-protect at least one sector of the non-volatile memory if the signature byte is not set to the value associated with the the write-enabled mode;
    after updating the signature byte from the default value to the updated value, prevent an entire sector in which the signature byte resides from being set to a predefined sector value unless a replacement firmware identifier associated with a replacement firmware matches a required replacement firmware identifier;
    determining whether a reflash of the non-volatile memory is authorized by comparing the replacement firmware identifier against the required replacement firmware identifier and indicating that reflash of the non-volatile memory is authorized if the replacement firmware identifier matches the required replacement firmware identifier; and
    if the reflash of the non-volatile memory is authorized, write-enabling the non-volatile memory, reflashing the non-volatile memory, and setting the signature byte to a value different from the value associated with the the write-enabled mode.

23. A processor readable storage medium storing code segments, that if executed by a processor, cause the processor to:
  update a signature byte, stored within a non-volatile memory, from a default value specifying a write-protected mode to an updated value specifying a write-enabled mode;
  after updating the signature byte from the default value to the updated value, determine that the signature byte is set to a value associated with the write-enabled mode;
  write-protect at least one sector of the non-volatile memory if the signature byte is not set to the value associated with the the write-enabled mode;
  after updating the signature byte from the default value to the updated value, prevent an entire sector in which the signature byte resides from being set to a predefined sector value unless a replacement firmware identifier associated with a replacement firmware matches a required replacement firmware identifier;
  determining whether a reflash of the non-volatile memory is authorized by comparing the replacement firmware identifier against the required replacement firmware identifier and indicating that reflash of the non-volatile memory is authorized if the replacement firmware identifier matches the required replacement firmware identifier; and
  if the reflash of the non-volatile memory is authorized, write-enabling the non-volatile memory, reflashing the non-volatile memory, and setting the signature byte to a value different from the value associated with the the write-enabled mode.

24. The processor readable storage medium of claim 23, wherein execution of the code segments further causes:
  after updating the signature byte from the default value to the updated value, write firmware to the non-volatile memory or modify portions of the firmware stored in the non-volatile memory if the signature byte is set to the value associated with the the write-enabled mode.

* * * * *